United States Patent
Murayama et al.

(10) Patent No.: US 9,651,776 B2
(45) Date of Patent: May 16, 2017

(54) SCANNER APPARATUS

(71) Applicants: FUNAI ELECTRIC CO., LTD., Osaka (JP); Kyoto University, Kyoto (JP)

(72) Inventors: Manabu Murayama, Itami (JP); Ryusuke Horibe, Hirakata (JP); Shingo Setono, Ikoma (JP); Tomohisa Hirai, Osaka (JP); Yuichiro Masuda, Takatsuki (JP); Atsushi Mushimoto, Daito (JP); Fumitoshi Matsuno, Kyoto (JP)

(73) Assignees: FUNAI ELECTRIC CO., LTD., Osaka (JP); KYOTO UNIVERSITY, Kyoto (JP)

( * ) Notice: Subject to any disclaimer, the term of this patent is extended or adjusted under 35 U.S.C. 154(b) by 0 days.

(21) Appl. No.: 14/812,170

(22) Filed: Jul. 29, 2015

(65) Prior Publication Data
US 2016/0033761 A1    Feb. 4, 2016

(30) Foreign Application Priority Data
Jul. 31, 2014 (JP) .................... 2014-156343

(51) Int. Cl.
*G02B 26/08*    (2006.01)
*G02B 26/10*    (2006.01)

(52) U.S. Cl.
CPC ......... *G02B 26/101* (2013.01); *G02B 26/085* (2013.01); *G02B 26/105* (2013.01)

(58) Field of Classification Search
CPC .............. G02B 26/105; G02B 26/0841; G02B 26/0833; G02B 26/0858; G02B 26/085; G02B 7/1821
USPC ......... 359/198.1, 199.1, 199.3, 200.1, 221.2, 359/226.1–226.2
See application file for complete search history.

(56) References Cited

U.S. PATENT DOCUMENTS

| 6,512,185 | B2 | 1/2003 | Itou |
| 6,549,348 | B2 | 4/2003 | Aizawa et al. |
| 2001/0025724 | A1 | 10/2001 | Aizawa et al. |
| 2002/0018274 | A1 | 2/2002 | Aizawa et al. |
| 2012/0133242 | A1* | 5/2012 | Njikam Njimonzie ............ B81B 3/0021 310/300 |

FOREIGN PATENT DOCUMENTS

| JP | 2001-264667 | 9/2001 |
| JP | 2011-95490 | 5/2011 |
| JP | 2013-246361 | 12/2013 |

* cited by examiner

*Primary Examiner* — James Phan
(74) *Attorney, Agent, or Firm* — Wenderoth, Lind & Ponack, L.L.P.

(57) ABSTRACT

A scanner apparatus includes: a scanner having a mirror that is driven into resonance in a first direction; a scanner holder holding the scanner and rotatable about an axis extending in a direction parallel to the first direction; and a driver that oscillates the scanner holder, and the scanner holder includes: a first holding portion holding the scanner; a second holding portion connected to the first holding portion and holding the driver; a connecting portion connected to the second holding portion; and an elastic portion connected to the connecting portion and having elasticity.

15 Claims, 11 Drawing Sheets

SCANNER APPARATUS

CROSS REFERENCE TO RELATED APPLICATION

The present application is based on and claims priority of Japanese Patent Application No. 2014-156343 filed on Jul. 31, 2014. The entire disclosure of the above-identified application, including the specification, drawings and claims is incorporated herein by reference in its entirety.

FIELD

The present invention relates to a scanner apparatus that scans light from a laser or the like by reflecting the light with a mirror.

BACKGROUND

Conventionally, scanners are used, for example, in scanning devices included in optical devices such as electrophotographic copiers, laser beam printers, and barcode readers, and scanner apparatuses included in tracking control devices for optical disks. The scanners are used in image display devices that display two-dimensional images by defecting and two-dimensionally scanning light.

The scanners have a mirror to which a laser beam is emitted, and oscillate the mirror in such a way that the laser beam reflected off the mirror is scanned on the top surface of a screen or the like. In the case of two-dimensionally scanning a laser beam, it is common to adopt two-axis scanning or separate scanning using scanners for horizontal motion and vertical motion. Specifically, a system for scanning along two axes with one scanner and a system for two-dimensional scanning through one-dimensional scanning processes with two scanners combined in the orthogonal directions have been proposed.

In recent years, a scanner with a micro mirror has been proposed which is manufactured using the semiconductor process technology and the micro electronic mechanical system (MEMS) technology (for example, refer to Patent Literature (PTL) 1). Especially, a scanner manufactured using the MEMS technology (an MEMS scanner) can be reduced in size and is capable of high speed operation as advantageous effects, and therefore is expected to be used in a high-resolution laser display and the like.

When the MEMS scanner is used in a display, two-dimensional deflection through raster scanning is adopted. The raster scanning is a combination of high-speed horizontal scanning (in the order of a few tens of kilohertz) and low-speed vertical scanning (in the order of a few tens of hertz). In the MEMS scanner, the high-speed horizontal scanning is performed by sine wave drive using a resonant frequency and the low-speed vertical scanning is performed by non-resonance drive using ramp waves so that the resolution can be increased.

CITATION LIST

Patent Literature

[PTL 1] Japanese Unexamined Patent Application Publication No. 2013-246361

SUMMARY

Technical Problem

The method using the non-resonance drive includes methods using electrostatic force, electromagnetic force, piezoelectric force, and the like. In order to make a scanner subject to the non-resonance drive, sufficient driving force that corresponds to a mirror oscillation angle of the scanner is necessary. Therefore, the driving method using electromagnetic force has a problem of increased power consumption, the driving method using electrostatic force has a problem of increased component cost and the like for an increase in driving voltage, and the driving method using piezoelectric force has a problem of the need for piezoelectric performance and a material of higher functionality.

In the MEMS scanner of the two-axis scanning type, the drive frequency in the vertical scanning and the resonant frequency are close, with the result that the resonant frequency may have an impact on the vertical scanning. Therefore, there is an attempt to configure the scanner with as high a resonant frequency as possible, which requires the scanner to have higher rigidity and in such a case, it is difficult to perform wide-angle scanning using the drive frequency.

The present invention has been conceived to solve the problem described above, and an object of the present invention is to provide a scanner apparatus that is capable of wide-angle vertical scanning even when a scanner has high rigidity.

Solution to Problem

In order to achieve the above-described object, a scanner apparatus according to one aspect of the present invention includes: a scanner having a mirror that is driven into resonance in a first direction; a scanner holder holding the scanner and rotatable about an axis extending in a direction parallel to the first direction; and a driver that oscillates the scanner holder, wherein the scanner holder includes: a first holding portion holding the scanner; a second holding portion connected to the first holding portion and holding the driver; a connecting portion connected to the second holding portion; and an elastic portion connected to the connecting portion and having elasticity.

According to this aspect, even when the scanner apparatus includes a rigid material so that an impact on the vertical drive frequency is reduced, the scanner apparatus is capable of performing the wide-angle vertical scanning as a result of including the elastic portion with which the scanner apparatus can easily be oscillated.

Furthermore, it is possible to achieve the wide-angle vertical scanning easily without changing the configuration or material specification of the scanner apparatus.

Furthermore, the package size of the scanner does not increase, allowing the scanner apparatus to be reduced in size.

For example, in the scanner apparatus according to an aspect of the present invention, the elastic portion may be formed of a plate-like member and positioned to make the center of the plate-like member in a thickness direction level with an axis of resonance of the mirror.

According to this aspect, it is possible to provide a high-performance scanner apparatus because the axis of rotation of the scanner apparatus matches the height of the axis of resonance of the scanner apparatus.

For example, in the scanner apparatus according to one aspect of the present invention, the elastic portion may protrude more than the second holding portion in a second direction crossing the first direction.

According to this aspect, in the configuration of the scanner apparatus, the elastic portion protrudes more than the second holding portion in the second direction, and therefore the scanner apparatus can be oscillated wide about the axis of rotation of the scanner holder.

For example, in the scanner apparatus according to one aspect of the present invention, the elastic portion may have substantial line symmetry about the axis of rotation of the scanner holder.

According to this aspect, the scanner apparatus maintains a symmetrical configuration and therefore can be stably oscillated.

For example, in the scanner apparatus according to one aspect of the present invention, the elastic portion may be formed of a leaf spring that is a combination of a plurality of angular U-shaped plate-like members alternately oriented in opposite directions with respect to the axis of rotation of the scanner holder.

According to this aspect, the scanner apparatus can easily be oscillated with torsion of a leaf spring, and therefore it is possible to perform the wide-angle vertical scanning even when the scanner apparatus includes a rigid material.

For example, in the scanner apparatus according to one aspect of the present invention, the plurality of angular U-shaped plate-like members of the leaf spring may comprise three angular U-shaped plate-like members on either side of the axis of rotation of the scanner holder.

According to this aspect, the leaf spring includes three angular U-shaped forms each in opposite directions along the axis of rotation of the scanner holder and thereby has greater elasticity.

For example, in the scanner apparatus according to one aspect of the present invention, the elastic portion may be formed of a plate-like member configuring the scanner holder, and be integrally formed with the scanner holder.

According to this aspect, the elastic member and the scanner holder are integrated by way of a plate-like member so that the scanner apparatus can be stably oscillated with torsion of the plate-like member.

For example, in the scanner apparatus according to one aspect of the present invention, the elastic portion may be formed of a spring member.

According to this aspect, the scanner apparatus can be oscillated with elastic force of the spring member.

For example, in the scanner apparatus according to one aspect of the present invention, the elastic portion may be formed of a rubber material.

According to this aspect, the scanner apparatus can be stably oscillated with elastic force of the rubber material.

For example, in the scanner apparatus according to one aspect of the present invention, a length of the elastic portion from the axis of rotation to an end of the elastic portion may be greater at a position closer to the connecting portion than at a position closer to a securing portion for securing the scanner holder, the end of the elastic portion being an end in the second direction.

According to this aspect, wider-angle vertical scanning can be performed because torsion of the elastic portion is greater on the connecting portion side than on the securing portion side.

For example, in the scanner apparatus according to one aspect of the present invention, a length of the elastic portion from the axis of rotation to an end of the elastic portion may be greater at a position closer to a securing portion for securing the scanner holder than at a position closer to the connecting portion, the end of the elastic portion being an end in the second direction.

According to this aspect, the scanner can be stably oscillated in the vertical scanning because torsion of the elastic portion is greater on the securing portion side than on the connecting portion side.

For example, in the scanner apparatus according to one aspect of the present invention, a part of the first holding portion to which one end of the scanner is secured and a part of the second holding portion to which one end of the driver is secured may be formed of a first plate-like member, a part of the first holding portion to which another end of the scanner is secured and a part of the second holding portion to which another end of the driver is secured may be formed of a second plate-like member, the connecting portion may (i) connect the one end of the first plate-like member and the one end of the second plate-like member to each other, (ii) connect the other end of the first plate-like member and the other end of the second plate-like member to each other, and (iii) be secured to one end of the elastic portion, the scanner apparatus may further comprise a securing portion connected to another end of the elastic portion, for securing the scanner holder, and the first plate-like member, the second plate-like member, the connecting portion, the elastic portion, and the securing portion may be integrally formed.

According to this aspect, oscillation of the permanent magnet can be efficiently transmitted to the scanner, allowing for an increase in amplitude of the oscillation of the scanner apparatus with accuracy. With this, the scanner apparatus is capable of performing the wide-angle scanning with efficiency and ease.

For example, in the scanner apparatus according to one aspect of the present invention, the driver may include (i) a coil formed by winding a conductor wire and (ii) a permanent magnet passing through the coil and held by the second holding portion, and the permanent magnet may be oscillated in a second direction according to a direction of current flowing through the conductor wire, the second direction crossing the first direction.

According to this aspect, electromagnetic force is used as driving force in the vertical direction, allowing for an increase in amplitude of the oscillation of the scanner apparatus. With this, the scanner apparatus is capable of performing the wide-angle scanning with ease.

For example, in the scanner apparatus according to one aspect of the present invention, the second holding portion may be formed only on one side of the first holding portion, and the driver may be held by the second holding portion.

According to this aspect, the scanner apparatus is configured to have only one second holding portion and one driver held by the second holding portion and therefore can be smaller in size.

For example, in the scanner apparatus according to one aspect of the present invention, the second holding portion may be formed one on either side of the first holding portion, and the driver may be held by the second holding portion in a one-to-one manner.

According to this aspect, the scanner apparatus maintains a symmetrical configuration and therefore can be stably oscillated.

Advantageous Effects

According to the present invention, it is possible to provide a scanner apparatus that is capable of wide-angle vertical scanning even when a scanner has high rigidity.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

Hereinafter, embodiments are described in greater detail with reference to the accompanying Drawings. Each of the following embodiments describes a general or specific example. The numerical values, shapes, materials, structural components, and the arrangement and connection of the structural components etc., shown in the following embodiments are mere examples, and therefore do not limit the present invention, the scope of which is defined in the appended Claims. Therefore, among the structural components in the following embodiments, structural components not recited in any one of the independent claims are described as preferred structural components, and are not absolutely necessary to overcome the problem according to the present invention. The Drawings are schematic drawings, and may not depict exact dimensions or dimensional ratios.

Embodiment 1

Configuration of Scanner Apparatus

In the following embodiment, a scanner apparatus for a display is described as an example.

Figure 1:
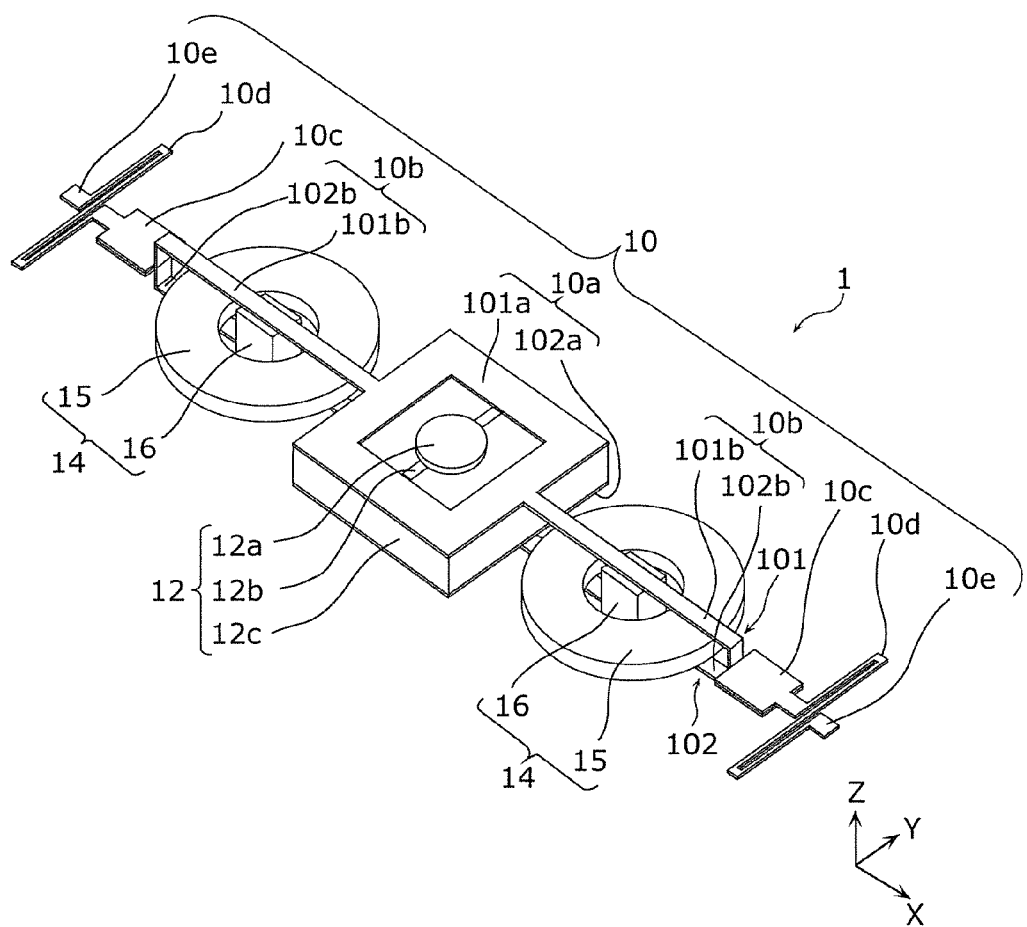
FIG. 1 is a perspective view of a configuration of a scanner apparatus according to Embodiment 1.
Figure 2:
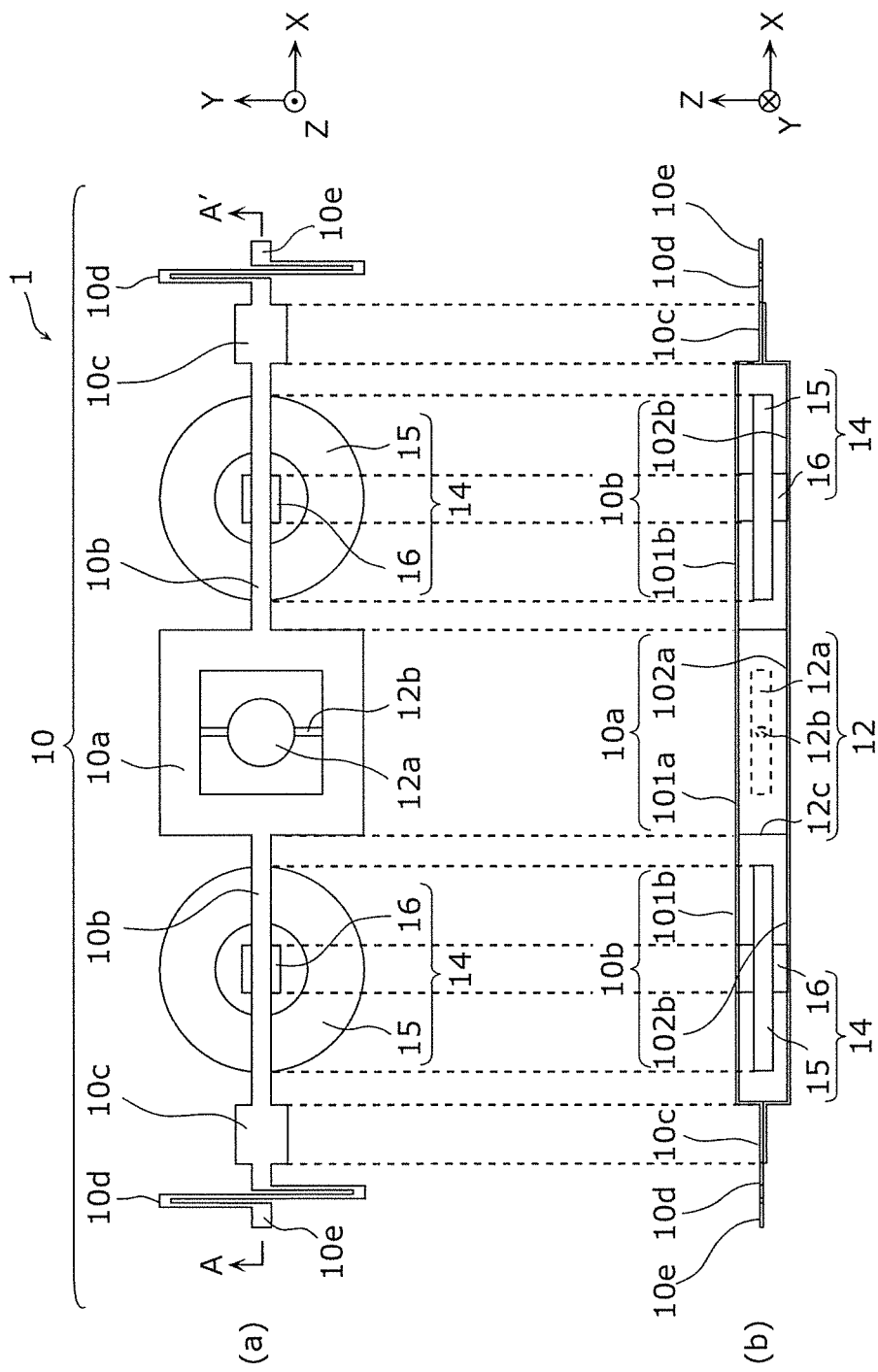
FIG. 2 illustrates a configuration of a scanner apparatus according to Embodiment 1, including a plan view thereof in (a) and a front view thereof in (b).
Figure 3:
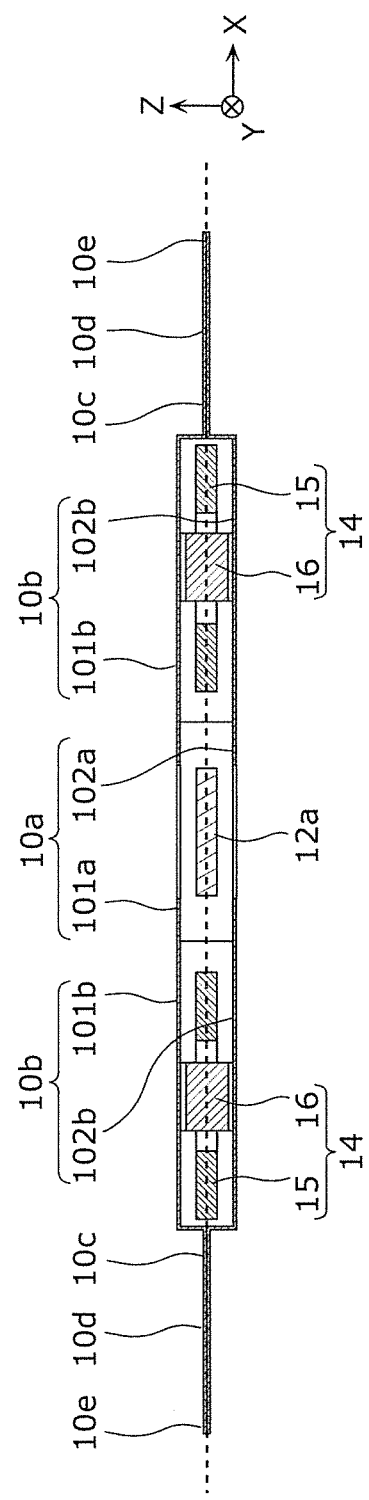
FIG. 3 is a cross-sectional view taken along line A-A' in (a) of FIG. 2.
Figure 4:
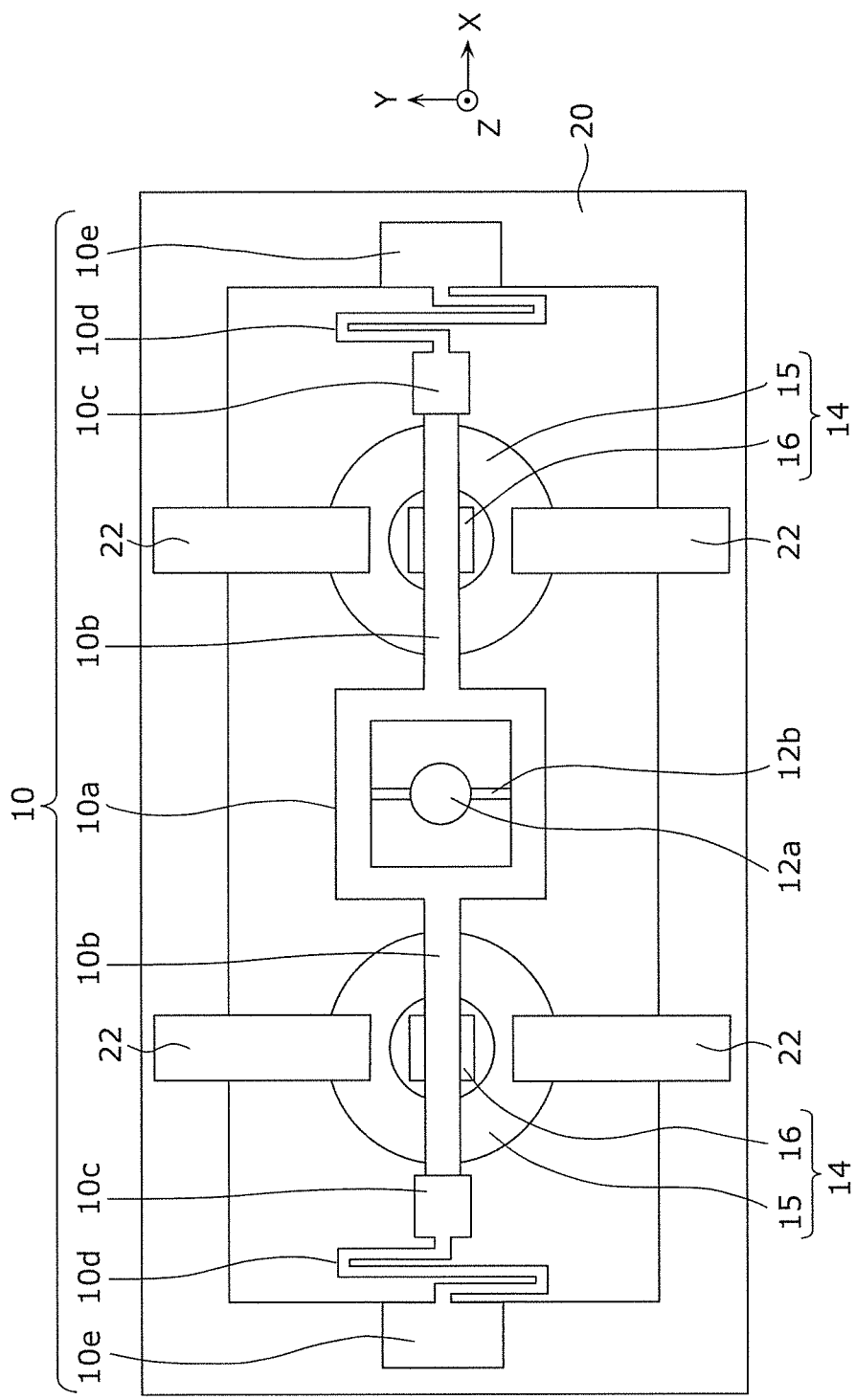
FIG. 4 illustrates a layout example of a scanner apparatus according to Embodiment 1.

First, a configuration of a scanner apparatus according to Embodiment 1 will be described with reference to FIG. 1 to FIG. 4. FIG. 1 is a perspective view of a configuration of a scanner apparatus according to this embodiment. FIG. 2 illustrates a configuration of a scanner apparatus according to this embodiment, including a plan view thereof in (a) and a front view thereof in (b). FIG. 3 is a cross-sectional view taken along line A-A' in (a) of FIG. 2. FIG. 4 illustrates a layout example of a scanner apparatus according to this embodiment.

As illustrated in FIG. 1, a scanner apparatus 1 according to this embodiment includes a scanner holder 10, a scanner 12, and a driver 14. The scanner holder 10 is elongated in the X-axis direction. The driver 14 includes a coil 15 and a permanent magnet 16.

The scanner 12 is what is called an MEMS scanner with a micro mirror manufactured using the MEMS technology. The scanner 12 includes a mirror 12a, a shaft 12b, and a scanner package 12c as illustrated in FIG. 1 and (a) of FIG. 2. The mirror 12a has a substantial disc-like shape and is connected to a side wall of the scanner package 12c via the shaft 12b in such a way as to be rotatable. The shaft 12b passes through the center of the disc from an edge of the disc.

The shaft 12b is connected to the scanner package 12c in such a way that the longitudinal direction of the shaft 12b is parallel to the Y-axis direction perpendicular to the X-axis direction. When the shaft 12b is connected to the scanner package 12c, a mirror surface of the mirror 12a is at a level equally distanced from the top end and the bottom end of the scanner 12 as illustrated in (b) of FIG. 2 and FIG. 3. In other words, the shaft 12b which is identical to an axis of resonance of the mirror 12a is placed in a position level with the center, in the thickness direction, of a later-described elastic portion 10d in the scanner holder 10.

The mirror 12a reflects laser light emitted from a light emitter (not illustrated in the Drawings), toward a screen of a display (not illustrated in the Drawings), for example. At this time, the mirror 12a rotates about the shaft 12b so that on the screen, the laser light is scanned in the X-axis direction perpendicular to the direction in which the shaft 12b extends (the Y-axis direction).

The X-axis direction and the Y-axis direction correspond to a first direction and a second direction, respectively, according to the present invention. The first direction and the second direction do not always need to be perpendicular to each other; it is sufficient that the first direction and the second direction cross each other.

The driver 14 includes the coil 15 and the permanent magnet 16.

The coil 15 is a hollow coil having a wound conductor wire. For example, a conductor wire made of copper is wound 200 times to form the coil 15.

The permanent magnet 16 is made of a neodymium magnet, for example, and is placed in such a position as to pass through the center of the coil 15. Furthermore, the permanent magnet 16 is held by a later-described magnet holding portion 10b of the scanner holder 10 on the top end and the bottom end.

The permanent magnet 16 has different magnetic poles in a direction across the scanner holder 10 extending in the X-axis direction. For example, the permanent magnet 16 has the N pole at an end on the positive side in the Y-axis direction, and the S pole at an end on the negative side in the Y-axis direction.

The scanner holder 10 includes a scanner holding portion 10a, a magnet holding portion 10b, a connecting portion 10c, an elastic portion 10d, and a securing portion 10e. The scanner holder 10 includes two sets of magnet holding portions 10b, connecting portions 10c, elastic portions 10d, and securing portions 10e. As illustrated in FIG. 1, the securing portion 10e, the elastic portion 10d, the connecting portion 10c, the magnet holding portion 10b, the scanner holding portion 10a, the magnet holding portion 10b, the connecting portion 10c, the elastic portion 10d, and the securing portion 10e are arranged in the stated order and formed integrally in the scanner holder 10. With this configuration, the scanner holder 10 is rotatable about an axis extending in the direction parallel to the X-axis direction.

The scanner holder 10 is made from a material easy to process, such as stainless steel, or a steel material for spring, for example.

The scanner holding portion 10a and the magnet holding portion 10b correspond to a first holding portion and a second holding portion, respectively, according to the present invention.

The scanner holding portion 10a and the magnet holding portion 10b each include a first plate-like member 101 and a second plate-like member 102 formed of one plate-like member as will be described in detail later. The first plate-like member 101 includes a first upper member 101a and a second upper member 101b. The second plate-like member 102 includes a first lower member 102a and a second lower member 102b.

To put it another way, the scanner holding portion 10a includes the first upper member 101a on the first plate-like member 101 and the first lower member 102a on the second plate-like member 102, and holds the scanner 12 between the first upper member 101a and the first lower member 102a. The magnet holding portion 10b includes the second upper member 101b on the first plate-like member 101 and the second lower member 102b on the second plate-like member 102, and holds the permanent magnet 16 between the second upper member 101b and the second lower member 102b.

Out of the first upper member 101a and the first lower member 102a in the scanner holding portion 10a, the first upper member 101a contacting the top end of the scanner 12 has a frame-like shape having an opening at the center with an outer circumference of a substantial square shape as illustrated in (a) of FIG. 2. The first lower member 102a contacting the bottom end of the scanner 12 has a substantial square shape identical to that of the first upper member 101a. The scanner 12 has the top end secured to the first upper member 101a and the bottom end secured to the first lower member 102a with an adhesive, for example.

Herein, upper/top indicates a direction toward the point of the arrow representing the Z-axis direction and lower/bottom indicates a direction toward the base of the arrow representing the Z-axis direction in FIG. 1.

Out of the second upper member 101b and the second lower member 102b in the magnet holding portion 10b, the second upper member 101b contacting the top end of the permanent magnet 16 has a rectangular shape elongated in the X-axis direction. The second lower member 102b contacting the bottom end of the permanent magnet 16 has a rectangular shape elongated in the X-axis direction that is identical to that of the second upper member 101b. The permanent magnet 16 has the top end secured to the second upper member 101b and the bottom end secured to the second lower member 102b with an adhesive, for example.

A pair of magnet holding portions 10b is connected to the scanner holding portion 10a on either side in the X-axis direction, each with one set of the second upper member 101b and the second lower member 102b.

Specifically, the scanner holding portion 10a and the magnet holding portions 10b include (i) the first plate-like member 101 on which the second upper member 101b, the first upper member 101a, the second upper member 101b are integrally formed in the stated order from one plate-like member (ii) the second plate-like member 102 on which the second lower member 102b, the first lower member 102a, and the second lower member 102b are integrally formed in the stated order from one plate-like member.

The first plate-like member 101 is bent at a substantially right angle at a predetermined length away from each of one end and the other end. The predetermined length is approximately half the height of the scanner 12 and the permanent magnet 16 in the Z-axis direction. The same is true for the second plate-like member 102.

The connecting portion 10c is formed into a plate-like shape using the same material as that of the first plate-like member 101 and the second plate-like member 102. The connecting portion 10c connects one end of the first plate-like member 101 to one end of the second plate-like member 102 and connects the other end of the first plate-like member 101 to the other end of the second plate-like member 102 as illustrated in (b) of FIG. 2 and FIG. 3. With this, the scanner 12 and the permanent magnet 16 are held between the first plate-like member 101 and the second plate-like member 102. The connecting portion 10c is at a level equally distanced from the top end and the bottom end of the scanner 12 and the permanent magnet 16 as illustrated in (b) of FIG. 2 and FIG. 3 because the length from each of one end and the other end to the bent position in the first plate-like member 101 is equal to the length from each of one end and the other end to the bent position in the second plate-like member 102.

The elastic portion 10d is formed of a leaf spring in which a plurality of angular U-shaped plate-like members formed of one plate-like member of which the connecting portion 10c is formed are combined in such a way as to be alternately oriented in opposite directions with respect to the axis of rotation of the scanner holder 10. As illustrated in FIG. 1 and (a) of FIG. 2, the elastic portion 10d is formed by patterning into such a shape that one plate-like member is reciprocated in the Y-axis direction so as to provide angular U-shaped forms. Specifically, the elastic portion 10d protrudes more than the magnet holding portion 10b in the Y-axis direction and has line symmetry (substantial line symmetry), flaring in an angular U-shaped form in the Y-axis direction, about the axis of rotation of the scanner holder 10. Since the elastic portion 10d is integrally formed with the connecting portion 10c from one plate-like member, the elastic portion 10d is also at a level almost equally distanced from the top end and the bottom end of the scanner 12 and the permanent magnet 16 as with the connecting portion 10c.

The securing portion 10e is formed by patterning using one plate-like member of which the elastic portion 10d is formed. The securing portion 10e is provided in order to secure the scanner holder 10 in place. For example, the securing portion 10e is secured to a substrate 20 in such a way that the scanner 12 and the driver 14 are disposed in an opening formed in the substrate 20 as illustrated in FIG. 4.

The coil 15 has the top end and the bottom end held by a support 22 disposed on the substrate 20, thereby being secured to the substrate 20 as illustrated in FIG. 4.

With this configuration, the scanner holder 10 moves, i.e., rotates about an axis connecting the securing portion 10e and the center of the mirror 12a, by driving force generated by the driver 14, as will be described in detail later.

Scanner Apparatus Operation

Figure 5:
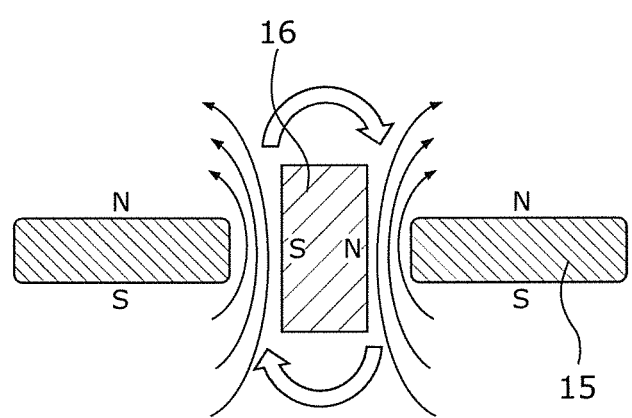
FIG. 5 illustrates a principle of operation of a scanner apparatus according to Embodiment 1.
Figure 6:
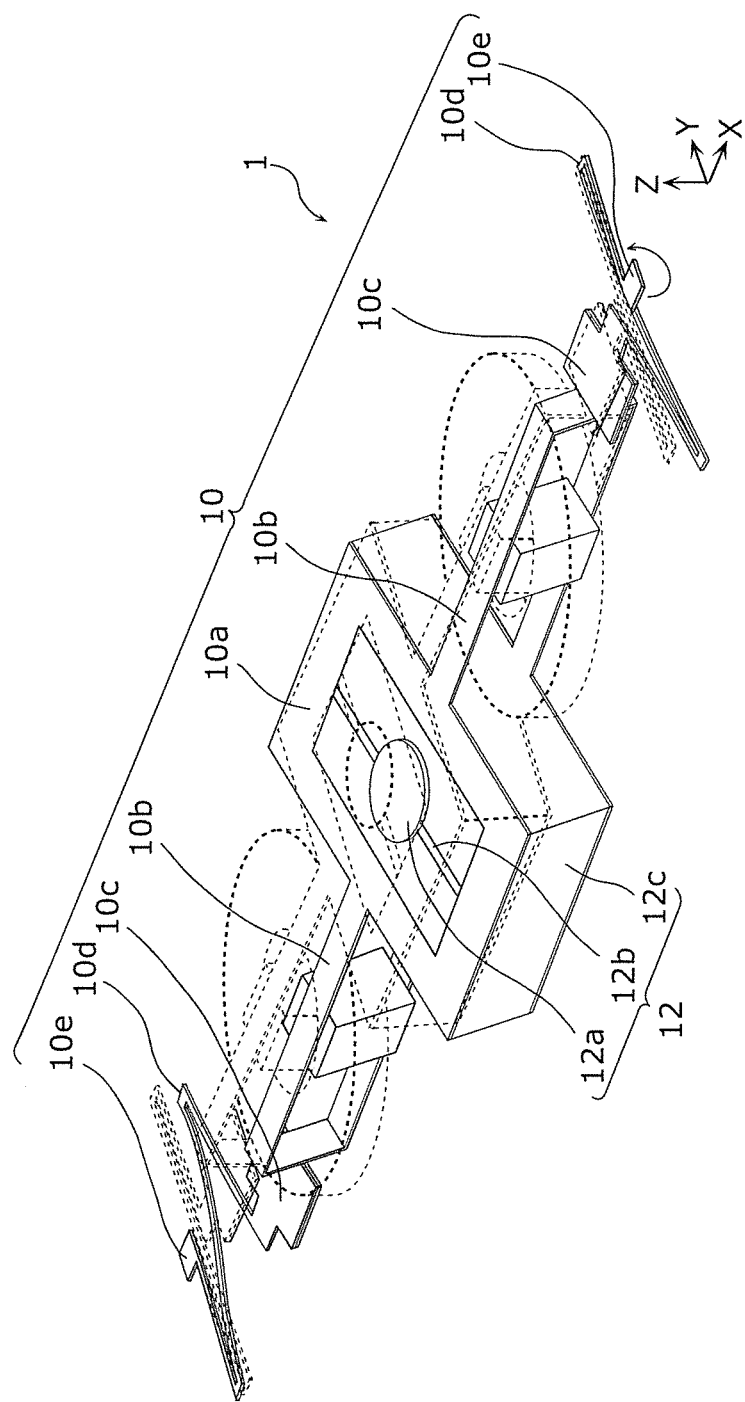
FIG. 6 illustrates how a scanner apparatus according to Embodiment 1 operates.

Next, how the scanner apparatus 1 according to this embodiment operates will be described with reference to FIG. 5 and FIG. 6. FIG. 5 illustrates a principle of operation of the scanner apparatus 1 according to this embodiment. FIG. 6 illustrates how the scanner apparatus 1 according to this embodiment operates.

First, the principle of operation of the scanner apparatus 1 will be described. As illustrated in FIG. 5, the driver 14 of the scanner apparatus 1 includes the coil 15 and the permanent magnet 16. The coil 15 passes alternating current at a predetermined frequency. For example, the coil 15 passes alternating current at a frequency of about a few tens of hertz.

When alternating current flows through the coil 15, the direction of magnetic flux passing through the coil 15 changes just like alternating current. In contrast, the direction of magnetic field of the permanent magnet 16 is constant. Therefore, the Lorentz force occurs between the coil 15 and the permanent magnet 16, causing the permanent magnet 16 to be tilted with respect to the coil 15. Since the direction of magnetic flux passing through the coil 15 changes just like alternating current, the magnetic poles of the coil 15 at the top end and the bottom end change alternately according to a frequency of the alternating current. This produces attracting force or repulsive force between the coil 15 and the permanent magnet 16, causing also the coil 15 to oscillate about the axis connecting the securing portion 10e and the center of the mirror 12a according to a frequency of the alternating current.

Since the permanent magnet 16 is secured to the magnet holding portion 10b of the scanner holder 10, the scanner holding portion 10a, the magnet holding portion 10b, the connecting portion 10c, and the elastic portion 10d of the scanner holder 10 also oscillate at this time about the axis connecting the securing portion 10e and the center of the mirror 12a according to oscillation of the permanent magnet 16 as illustrated in FIG. 6.

Along with the oscillation of the scanner holder 10, the mirror 12a of the scanner 12 also oscillates about the axis connecting the securing portion 10e and the center of the mirror 12a. Accordingly, laser light emitted from a light emitter (not illustrated in the Drawings) and reflected off the mirror 12a is scanned in the Y-axis direction on a screen (not illustrated in the Drawings).

Furthermore, the mirror 12a is driven to rotate about the axis 12b by sine wave drive using a resonant frequency of about a few tens of kilohertz. Accordingly, laser light emitted from the light emitter and reflected off the mirror 12a is scanned at high speed also in the X-axis direction on the screen.

Thus, on the screen, the laser light emitted to the mirror 12a is vertically scanned at low speed in the Y-axis direction while being horizontally scanned at high speed in the X-axis direction.

The use of a rigid material generally causes a decrease in amplitude of the above-described oscillation of the scanner holder 10, but in the scanner apparatus 1 according to this embodiment, the scanner holder 10 includes the elastic portion 10d having the leaf-spring configuration, and therefore the scanner holder 10 can easily be rotated with torsion of the leaf spring. Thus, the oscillation in the Y-axis direction can be greater in amplitude while the scanner holder 10 is given higher rigidity to reduce the impact due to the resonant frequency.

ADVANTAGEOUS EFFECT

As described above, the scanner apparatus 1 according to this embodiment includes the leaf-spring-like elastic portion 10d and is easily oscillated with torsion of the elastic portion 10d, thereby being capable of wide-angle vertical scanning, even when the scanner apparatus 1 includes a rigid material in order to reduce the impact due to the resonant frequency for horizontal scanning.

The above-described resonant frequency is determined based on the configuration or material properties of the scanner apparatus and therefore cannot easily be changed once the configuration or material specification of the scanner apparatus is set. If the mirror size or the entire apparatus size needs to be changed, prolonged analysis and more cost are required for simulations or prototypes. In this regard, the scanner apparatus 1 according to this embodiment is capable of achieving the wide-angle vertical scanning easily without changing the configuration or material specification of the scanner apparatus as described above.

Furthermore, there is only the need to provide the elastic potion 10d as described above. Thus, the package size of the scanner 12 will not increase and therefore the scanner apparatus 1 can be small in size.

Variation 1 of Embodiment 1

Figure 7:
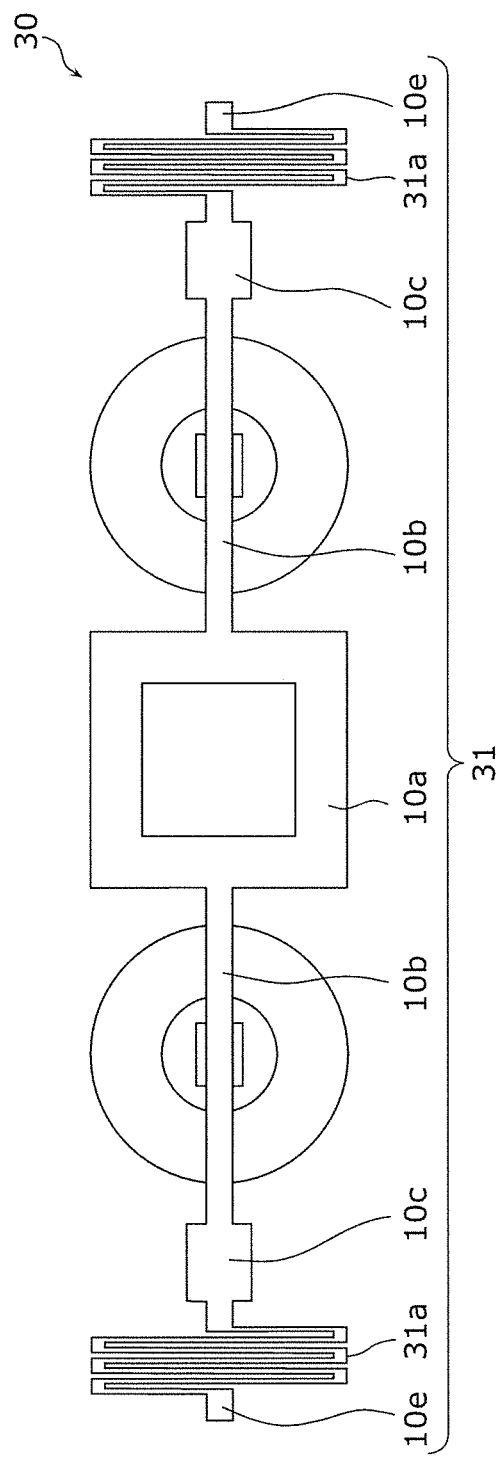
FIG. 7 is a plan view illustrating a configuration of a scanner apparatus according to Variation 1 of Embodiment 1.

Next, a scanner apparatus according to Variation 1 of Embodiment 1 will be described with reference to FIG. 7. FIG. 7 is a plan view illustrating a configuration of a scanner apparatus according to this variation.

The scanner apparatus according to this variation is different from the scanner apparatus according to Embodiment 1 in that the elastic portion includes a plurality of angular U-shaped forms.

In a scanner apparatus 30 according to this variation, an elastic portion 31a is formed by patterning into such a shape that one plate-like member is reciprocated more than one time, specifically, three times, in the Y-axis direction so as to provide angular U-shaped forms as illustrated in FIG. 7. Specifically, the elastic portion 31a has substantial line symmetry, including three angular U-shaped forms flaring at the same distance in the Y-axis direction, about the axis of rotation of a scanner holder 31.

With this configuration, the oscillation in the Y-axis direction can be increased in amplitude while the scanner holder 31 is stably rotated about the axis connecting the securing portion 10e and the center of the mirror 12a.

Note that although the elastic portion 31a has substantial line symmetry, including three angular U-shaped forms flaring at the same distance in the Y-axis direction, about the axis of rotation of the scanner holder 31 in the above-described variation, the number of angular U-shaped forms is not limited to three and may be two or not less than four. In addition, the size of the angular U-shaped forms may also be changed as appropriate.

Variation 2 of Embodiment 1

Figure 8:
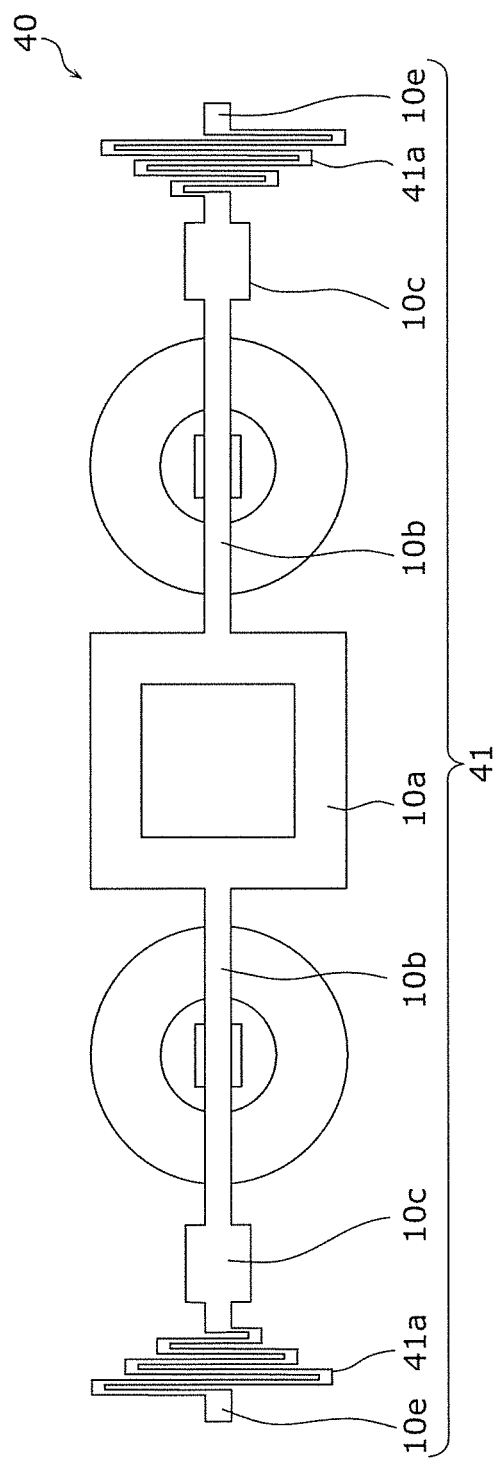
FIG. 8 is a plan view illustrating a configuration of a scanner apparatus according to Variation 2 of Embodiment 1.

Next, a scanner apparatus according to Variation 2 of Embodiment 1 will be described with reference to FIG. 8. FIG. 8 is a plan view illustrating a configuration of a scanner apparatus according to this variation.

The scanner apparatus according to this variation is different from the scanner apparatus according to Embodiment 1 in that the elastic portion includes a plurality of angular U-shaped forms at different distances in the Y-axis direction from an axis.

In a scanner apparatus 40 according to this variation, an elastic portion 41a is formed by patterning into such a shape that one plate-like member is reciprocated more than one time, specifically, three times, in the Y-axis direction so as to provide angular U-shaped forms as illustrated in FIG. 8. Furthermore, the elastic portion 41a is in such a shape that three angular U-shaped forms flare at different distances in the Y-axis direction with respect to the axis of rotation of a scanner holder 41. This distance in the Y-axis direction gradually changes in such a manner that an angular U-shaped form closer to the connecting portion 10c is at a shorter distance while an angular U-shaped form closer to the securing portion 10e is at a greater distance. With this, the elastic portion 41a is in the shape of a triangle having substantial line symmetry about the axis extending the X-axis direction.

With this configuration, oscillation of a part closer to the securing portion 10e can be greater in amplitude than oscillation of a part closer to the connecting portion 10c, making it possible to increase the amplitude of the oscillation in the Y-axis direction while more stably rotating the scanner holder 41 about the axis connecting the securing portion 10e and the center of the mirror 12a.

Although the elastic portion 41a is formed having the above-mentioned distance in the Y-axis direction changing such that an angular U-shaped form closer to the connecting portion 10c is at a shorter distance while an angular U-shaped form closer to the securing portion 10e is at a greater distance in the above-described variation, the shape of the elastic portion 41a is not limited to the above-described shape; the elastic portion 41a may be formed having the above-mentioned distance in the Y-axis direction changing such that an angular U-shaped form closer to the connecting portion 10c is at a greater distance while an angular U-shaped form closer to the securing portion 10e is at a shorter distance. Furthermore, the elastic portion 41a does not need to be formed in such a way that the above-mentioned distance in the Y-axis direction gradually increases or decreases from an angular U-shaped form close to the connecting portion 10c to an angular U-shaped form close to the securing portion 10e. This may be changed as appropriate.

Embodiment 2

Figure 9:
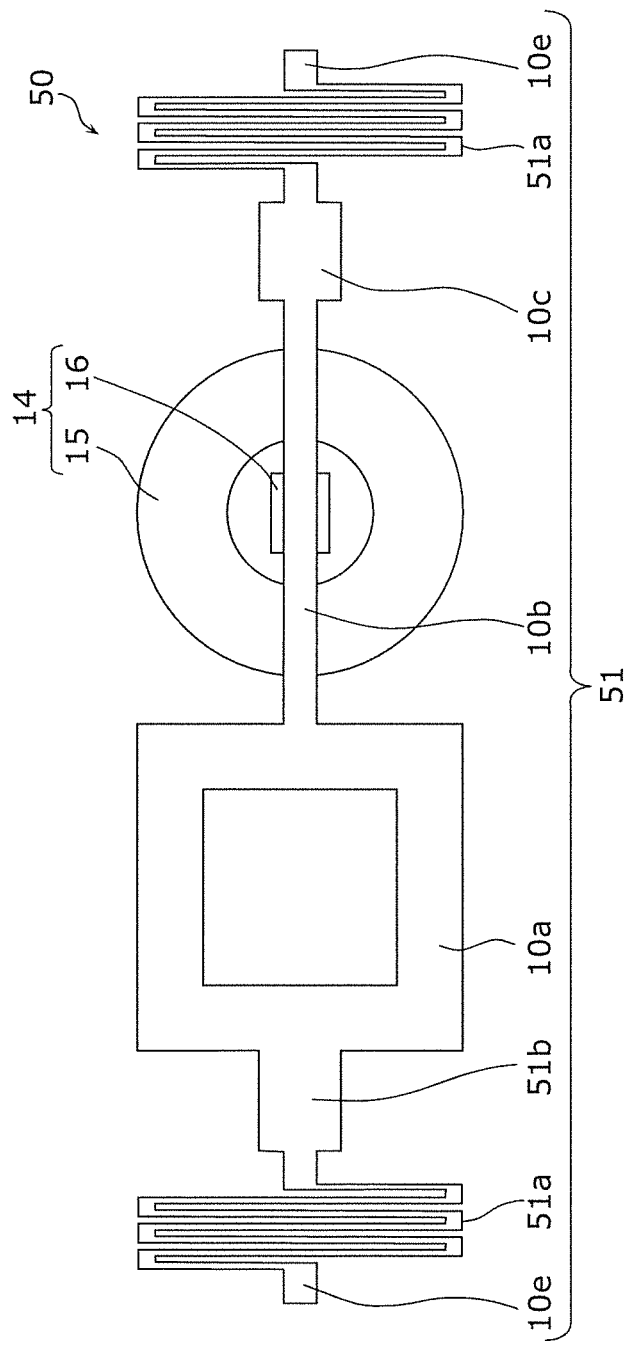
FIG. 9 is a plan view illustrating a configuration of a scanner apparatus according to Embodiment 2.

Next, a scanner apparatus according to Embodiment 2 will be described with reference to FIG. 9. FIG. 9 is a plan view illustrating a configuration of a scanner apparatus according to this embodiment.

The scanner apparatus according to this embodiment is different from the scanner apparatus according to Embodiment 1 in that the driver is disposed only in one place for the scanner 12.

As illustrated in FIG. 9, the driver is disposed only on one side of the scanner 12 in a scanner apparatus 50 according to this embodiment.

In order to achieve this configuration, a scanner holder 51 in the scanner apparatus 50 according to this embodiment does not include the magnet holding portion that is provided on one side of the scanner holding portion 10a in the scanner holder 10 according to Embodiment 1, and thus the scanner holding portion 10a is continuous to a connecting portion 51b in the scanner holder 51. As in Variation 1 of Embodiment 1, an elastic portion 51a of the scanner holder 51 has substantial line symmetry, including three angular U-shaped forms flaring at the same distance in the Y-axis direction, about an axis of rotation of the scanner holder 51.

With this configuration, the scanner apparatus 50 can be smaller in size by including only one driver 14.

Note that although the configuration of the scanner apparatus 50 is asymmetry as a result of including only one driver 14, a structural change in the elastic portion 51a makes it possible to increase the amplitude of the oscillation in the Y-axis direction while stably rotating the scanner holder 51 about the axis connecting the securing portion 10e and the center of the mirror 12a.

Embodiment 3

Figure 10:
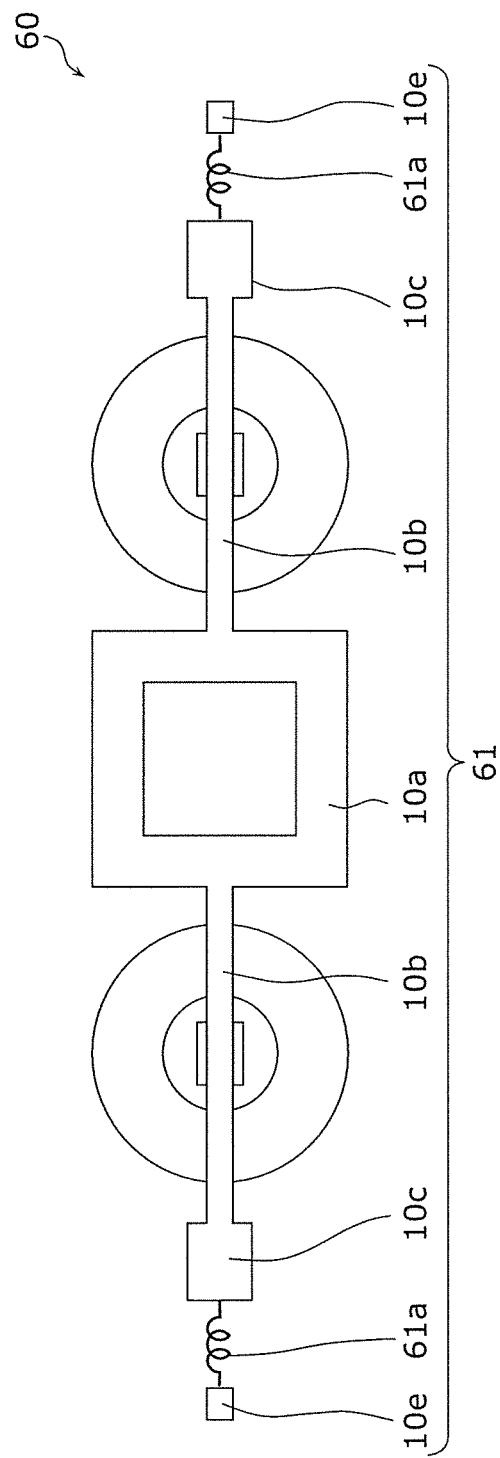
FIG. 10 is a plan view illustrating a configuration of a scanner apparatus according to Embodiment 3.

Next, a scanner apparatus according to Embodiment 3 will be described with reference to FIG. 10. FIG. 10 is a plan view illustrating a configuration of a scanner apparatus according to this embodiment.

The scanner apparatus according to this embodiment is different from the scanner apparatus according to Embodiment 1 in that the elastic portion is formed of a spring member.

As illustrated in FIG. 10, an elastic portion 61a is formed of a member different from those of the scanner holding portion 10a, the magnet holding portion 10b, the connecting portion 10c, and the securing portion 10e in a scanner apparatus 60 according to this embodiment. For example, the elastic portion 61a is formed of a spring member.

With this configuration, the spring member makes it possible to increase the amplitude of the oscillation of the scanner holder 61 in the Y-axis direction and in addition, it is possible to reduce the impact due to the resonant frequency for horizontal scanning, to stably oscillate the scanner holder 61 in the Y-axis direction.

Note that although the elastic portion 61a is formed of a spring member in this embodiment, the elastic portion 61a is not limited to being formed of the spring member and may be formed of other elastic material. For example, an elastic portion formed of a rubber material may be used.

Embodiment 4

Figure 11:
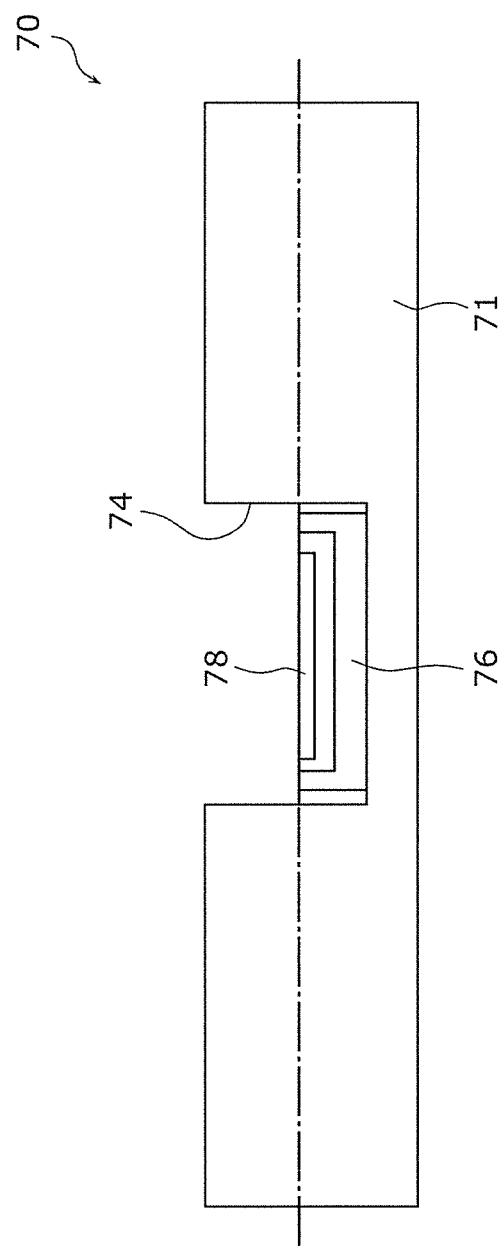
FIG. 11 is a cross-sectional view illustrating a configuration of a frame of a scanner apparatus according to Embodiment 4.

Next, a scanner apparatus according to Embodiment 4 will be described with reference to FIG. 11. FIG. 11 is a cross-sectional view illustrating a configuration of a frame of a scanner apparatus according to this embodiment.

The scanner apparatus according to this embodiment is different from the scanner apparatus according to Embodiment 1 in that the scanner is configured not to include the package.

In the scanner apparatus 1 according to Embodiment 1, the scanner 12 includes the package, and therefore the scanner package 12c is held by the scanner holding portion 10a on the top end and the bottom end. In this regard, the scanner apparatus according to this embodiment includes a frame 70 having steps formed by etching, instead of the scanner package 12c. In the scanner apparatus according to this embodiment, a scanner of a one-axis scanning type is placed in the frame 70, and the frame 70 is held by the scanner holding portion 10a, allowing the same or similar operation as the scanner apparatus according to Embodiment 1.

The frame 70 has a substantial square shape when the outer circumference thereof is seen in a plan view, and includes a recess 74 in a central part as illustrated in FIG. 11. The recess 74 is formed having a depth such that when a scanner 76 is placed in the recess 74, the mirror surface of a mirror 78 is at the center, in the thickness direction, of the frame 70. This means that the scanner apparatus according to this embodiment rotates about an axis passing through the center of the mirror surface of the mirror 78.

With this configuration, the scanner apparatus according to this embodiment is capable of increasing the oscillation in the Y-axis direction while rotating about the axis passing through the center of the mirror surface of the mirror 78.

Note that the frame 70 may be integrally formed with the scanner holding portion of the scanner holder.

Hereinbefore the scanner apparatus according to the present invention has been described based on Embodiments 1 through 4, but the present invention is not limited to these embodiments.

For example, although the elastic portion has substantial line symmetry, including the angular U-shaped forms flaring at the same distance in the Y-axis direction, about the axis of rotation of the scanner holder in the above-described embodiment, the number of angular U-shaped forms is not limited to one and may be two or not less than three. In addition, the size of the angular U-shaped forms may also be changed as appropriate.

The elastic portion may be formed in such a way that the distance of the angular U-shaped form in the Y-axis direction changes so that an angular U-shaped form closer to the connecting portion is at a shorter distance while an angular U-shaped form closer to the securing portion is at a greater distance. Alternatively, the elastic portion may be formed in such a way that the distance of the angular U-shaped form in the Y-axis direction changes so that an angular U-shaped form closer to the connecting portion is at a greater distance while an angular U-shaped form closer to the securing portion is at a shorter distance. Furthermore, the elastic portion does not need to be formed in such a way that the distance of the angular U-shaped form in the Y-axis direction gradually increases or decreases from an angular U-shaped form close to the connecting portion to an angular U-shaped form close to the securing portion. This may be changed as appropriate.

In the scanner apparatus, the driver may be provided one on either side of the scanner, that is, two drivers may be provided in total, and alternatively only one driver may be provided on one side of the scanner.

The elastic portion may be formed of a plate-like member configuring the scanner holder and alternatively may be formed of other material. For example, the elastic portion may be formed of a spring member or a rubber material. As yet another example, the elastic portion may be formed of other elastic material.

Furthermore, the above embodiments and the above variations may be combined.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention is applicable as, for example, a scanning device included in an optical device such as an electrophotographic copier, a laser beam printer, and a barcode reader, and a scanner apparatus included in a tracking control device for optical disks and a laser display.

The invention claimed is:

1. A scanner apparatus comprising:
a scanner having a mirror that is driven into resonance in a first direction;
a scanner holder holding the scanner and rotatable about an axis extending in a direction parallel to the first direction; and
a driver that oscillates the scanner holder,
wherein the scanner holder includes:
a first holding portion holding the scanner;
a second holding portion connected to the first holding portion and holding the driver;
a connecting portion connected to the second holding portion; and
an elastic portion connected to the connecting portion and having elasticity.

2. The scanner apparatus according to claim 1,
wherein the elastic portion is formed of a plate-like member and positioned to make the center of the plate-like member in a thickness direction level with an axis of resonance of the mirror.

3. The scanner apparatus according to claim 1,
wherein the elastic portion protrudes more than the second holding portion in a second direction crossing the first direction.

4. The scanner apparatus according to claim 1,
wherein the elastic portion has substantial line symmetry about the axis of rotation of the scanner holder.

5. The scanner apparatus according to claim 1,
wherein the elastic portion is formed of a leaf spring that is a combination of a plurality of angular U-shaped plate-like members alternately oriented in opposite directions with respect to the axis of rotation of the scanner holder.

6. The scanner apparatus according to claim 5,
wherein the plurality of angular U-shaped plate-like members of the leaf spring comprise three angular U-shaped plate-like members on either side of the axis of rotation of the scanner holder.

7. The scanner apparatus according to claim 1,
wherein the elastic portion is formed of a plate-like member configuring the scanner holder, and is integrally formed with the scanner holder.

8. The scanner apparatus according to claim 1,
wherein the elastic portion is formed of a spring member.

9. The scanner apparatus according to claim 1,
wherein the elastic portion is formed of a rubber material.

10. The scanner apparatus according to claim 3,
wherein a length of the elastic portion from the axis of rotation to an end of the elastic portion is greater at a position closer to the connecting portion than at a position closer to a securing portion for securing the scanner holder, the end of the elastic portion being an end in the second direction.

11. The scanner apparatus according to claim 3,
wherein a length of the elastic portion from the axis of rotation to an end of the elastic portion is greater at a position closer to a securing portion for securing the scanner holder than at a position closer to the connecting portion, the end of the elastic portion being an end in the second direction.

12. The scanner apparatus according to claim 1,
wherein a part of the first holding portion to which one end of the scanner is secured and a part of the second holding portion to which one end of the driver is secured are formed of a first plate-like member,
a part of the first holding portion to which another end of the scanner is secured and a part of the second holding portion to which another end of the driver is secured are formed of a second plate-like member,
the connecting portion (i) connects the one end of the first plate-like member and the one end of the second plate-like member to each other, (ii) connects the other end of the first plate-like member and the other end of the second plate-like member to each other, and (iii) is secured to one end of the elastic portion,
the scanner apparatus further comprises a securing portion connected to another end of the elastic portion, for securing the scanner holder, and
the first plate-like member, the second plate-like member, the connecting portion, the elastic portion, and the securing portion are integrally formed.

13. The scanner apparatus according to claim 1,
wherein the driver includes (i) a coil formed by winding a conductor wire and (ii) a permanent magnet passing through the coil and held by the second holding portion, and
the permanent magnet is oscillated in a second direction according to a direction of current flowing through the conductor wire, the second direction crossing the first direction.

14. The scanner apparatus according to claim 1,
wherein the second holding portion is formed only on one side of the first holding portion, and
the driver is held by the second holding portion.

15. The scanner apparatus according to claim 1,
wherein the second holding portion is formed one on either side of the first holding portion, and
the driver is held by the second holding portion in a one-to-one manner.

\* \* \* \* \*